J. J. St Ledger,
Animal Trap.
No. 88,526.  Patented Mar. 30, 1869.
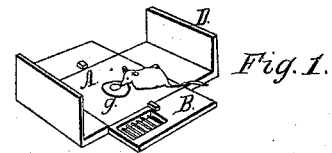
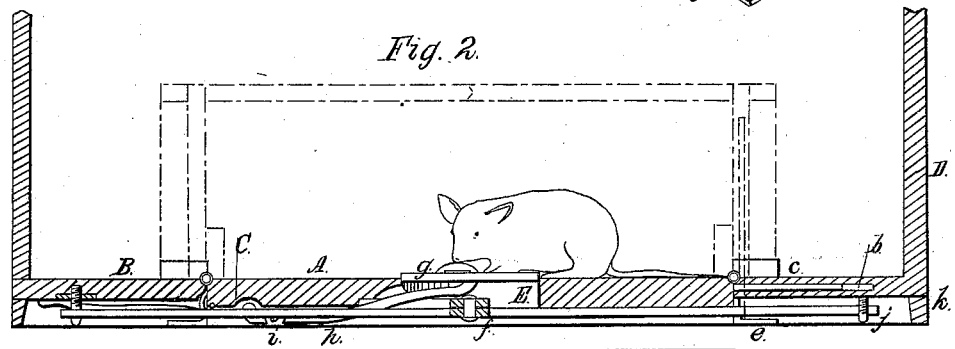
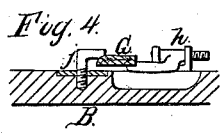
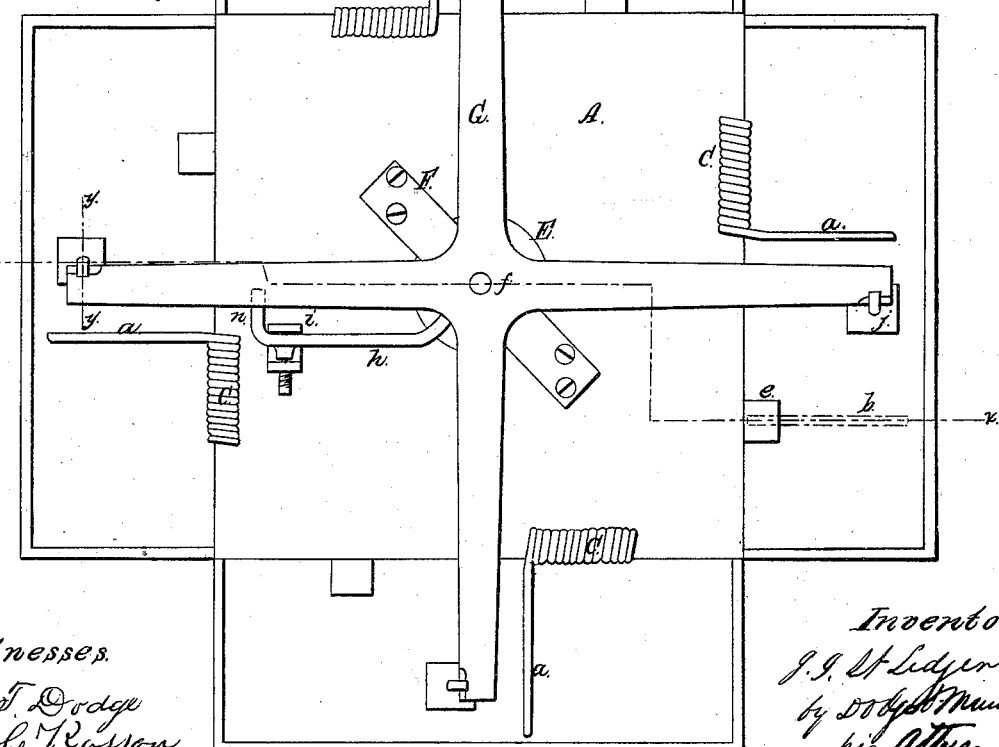
Witnesses.
P. T. Dodge
A. C. Rosson
Inventor.
J. J. St Ledger
by Dodge & Munn
his Attys.

J. J. ST. LEDGER, OF PHILADELPHIA, PENNSYLVANIA.

*Letters Patent No. 88,526, dated March 30, 1869; antedated March 25, 1869.*

IMPROVED ANIMAL-TRAP.

The Schedule referred to in these Letters Patent and making part of the same.

*To all whom it may concern:*

Be it known that I, J. J. ST. LEDGER, of Philadelphia, in the county of Philadelphia, and State of Pennsylvania, have invented certain new and useful Improvements in Animal-Traps; and I do hereby declare that the following is a full, clear, and exact description thereof, reference being had to the accompanying drawings, making part of this specification, and to the letters of reference marked thereon, like letters indicating like parts, wherever they occur.

To enable others skilled in the art to construct and use my invention, I will proceed to describe it.

My invention relates to animal-traps, designed specially for rat-traps; and consists in hinging the sides of a box to its bottom, and in the construction and arrangement of certain novel devices for setting it open and springing the sides together, so as to enclose the animal.

In the drawings—

Figure 1 is a perspective view of my trap, set;

Figure 2 is a longitudinal vertical section on the line x–x of fig. 3;

Figure 3 is a bottom plan view of my trap, set; and

Figure 4 is a vertical section of a part detached, on the line y–y of fig. 3.

I construct my trap so that when closed it may form a rectangular box of any desired dimensions.

To the bottom A, I hinge the sides B, so that they may be turned down in the same plane with it, and to two of the sides B, I rigidly attach, at right angles with them, the pieces D, of the requisite shape and size to form, together, the cover, or top of the trap when it is closed, as shown in figs. 1 and 2.

In the edges of the bottom A, I place coiled springs C.

One end of these springs is attached to the bottom A, and the other, a, bears loosely against the sides B, as shown clearly in fig. 3.

Each of the sides B is provided with a circular hole, b, in which is placed loosely, so as to allow of its free movement, a bolt, c, as shown in fig. 2.

When the sides B are upright, these bolts c drop down against little projections e, attached to the bottom A, and shown in fig. 3.

In the centre of the bottom A, I make a circular opening, E, and across it, on the under side, fasten a plate, F, and to this plate attach, loosely, by a pin, f, so as to permit a lateral movement, the metal cross G, as shown in fig. 3.

Above the plate F, and so as to fit easily in the opening E, I place a disk, g, which I attach to one end of a trigger, h, which is bent so as to pass along the under side of the bottom A, as shown in figs. 2 and 3.

This trigger h is arranged to turn upon a pin, i, attached to the under side of the bottom A, and near one of the arms of the cross G, as shown in fig. 3, and has its end bent, as shown in the same figure, so as to pass a short distance under the arm of the cross, and is provided with a shoulder, n, for the edge of the arm to bear against.

To each of the sides B, and so as to be near the ends of the arms of the cross G, I attach small plates H, and screw into them hooks j, so as to admit of being turned.

The under sides of these hooks j are bevelled, as well as the immediate opposite edge of the arms of the cross G, for a purpose hereinafter explained.

The edges of the sides of the trap, except the bottom edge, is provided with a projecting rim, k, shown in fig. 2, and one of the sides is provided with a grating, l, and door inside of it, which is arranged to slide laterally.

When my trap is closed, as shown by the red lines in fig. 2, the bolts c drop down against the projections e, and keep it closed.

In setting the trap, it may be turned bottom up, when the bolts c will fall back and release the sides, which are now turned back, and the hooks j and the arms of the cross G arranged so that their bevelled surfaces may bear against each other; at the same time the trigger h is set, so that the shoulder n may bear against the edge of one arms of the cross G.

The trap is now set.

The pressure of the coiled springs C, by means of their ends a, bears against the sides B, which, in turn, by means of the hooks j, with their bevelled surfaces, press against the arms of the cross G, which is held in place by the shoulder n on the trigger h.

The trap is now turned over to its proper position, and baited, by placing any suitable bait on the disk g, as shown in fig. 1.

As soon as the animal places any weight upon the disk, it is pressed down, the shoulder n released, and the trap sprung.

In being sprung, the sides are thrown up, and the animal enclosed.

Whenever the trap is found sprung, the door behind the bars l may be moved, and the inside examined.

As all the mechanism of this trap is on its under side, and out of sight, there is nothing to awaken any suspicion on the part of the animal; and seeing nothing but a plain surface when the trap is set, he readily seizes the bait.

In the construction of the traps for use, I arrange the disk g and the door behind the grates l, so as to be on a line with the interior surface of the trap, leaving no part of the mechanism in sight, to attract attention.

Having thus described my invention,

What I claim, is—

1. A box-shaped trap, with its top consisting of two parts D, connected to two of its sides B, and with its sides B hinged to its bottom A, and arranged to be held open by the hooks $j$, cross G, and trigger $h$, constructed and arranged to operate substantially as herein described.

2. The cross G, in combination with the trigger $h$, hooks $j$, and spring C, all constructed and arranged to operate substantially as herein described.

3. In combination with the sides B and projections $e$, the loosely-moving bolts $c$, for locking the trap when sprung, substantially as herein described.

J. J. ST. LEDGER.

Witnesses:
    FRANK FITZGERALD,
    JAMES FITZGERALD.